June 25, 1963 W. H. WOODWARD 3,095,530
DIGITAL CONTROL APPARATUS FOR WARD-LEONARD ELECTRICAL MACHINES
Filed May 22, 1959 2 Sheets-Sheet 2
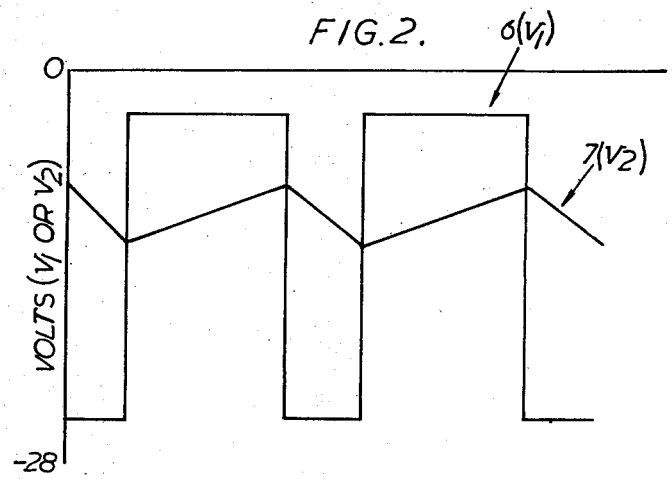
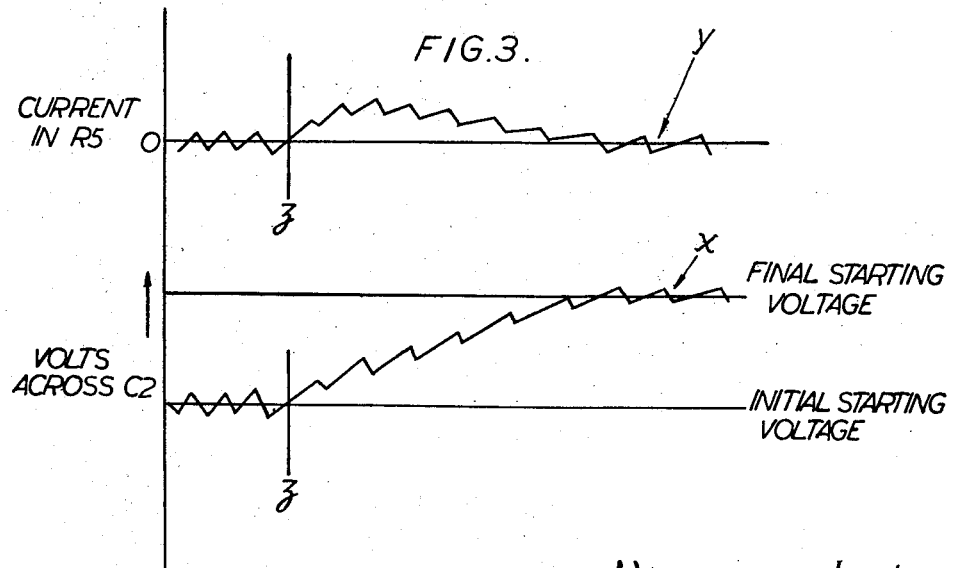

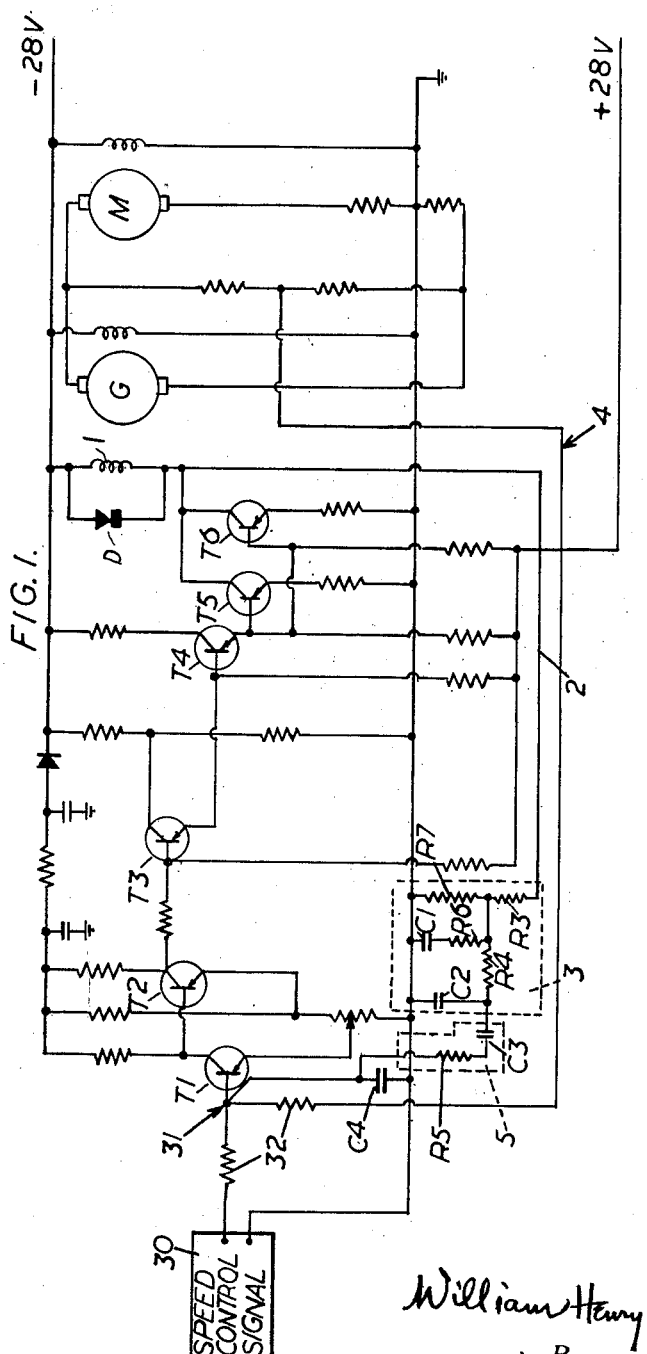

3,095,530
DIGITAL CONTROL APPARATUS FOR WARD-LEONARD ELECTRICAL MACHINES

William Henry Woodward, Weeping Cross, Stafford, England, assignor to Lancashire Dynamo Electronic Products Limited, Rugeley, Staffordshire, England, a British company Filed May 22, 1959, Ser. No. 815,226
1 Claim. (Cl. 318—145)

This invention relates to automatic control systems for electrical machines and particularly to systems for controlling the excitation of direct-current generators, direct-current motors and alternators. Such systems are ordinarily arranged to regulate the supply of power to the controlled machine in dependence upon the output of a comparison element, which output represents the deviation of the system, being equal to the difference between a control signal representing a desired value of the controlled condition of the machine and a monitoring feedback signal representing the actual value of the controlled condition.

The use of amplifiers, particularly transistor amplifiers, for such control is often difficult, because of the considerable amount of power dissipation required in the amplifier itself to effect a desired regulation of the controlled condition of the machine. The present invention provides an automatic controller in which this difficulty is overcome by employing a pulse-width modulation type of controlling action which switches the amplifier from a low power output condition to a high power output condition and then from a high power output condition to a lower power output condition at intervals so regulated as to control the effective power output by altering the relative durations of the periods of low and high power output of the amplifier. With this type of controlling action, the effective power dissipation in the amplifier can be kept small by making the output current of the amplifier low during periods of low power output and making the voltage drop in the amplifier small during periods of high power output.

The principal object of the present invention is to provide an improved method of and apparatus for controlling a current supply to an electrical machine by switching an amplifier from a low power output condition to a high power output condition and then from a high power output condition to a low power output condition at intervals as aforesaid, wherein the oscillations necessary for effecting the switching of the amplifier are generated in the amplifier itself by means of a feedback originating at the output of the amplifier.

Another object of the invention is to provide an automatic control apparatus in which the power output is repeatedly switched from a maximum to a minimum and then from a minimum to a maximum by a hunting action which automatically adjusts itself so as to regulate the relative duration of the periods of low and high power output according to the control action required.

A control circuit for a Ward-Leonard system will be described more in detail by way of example with reference to the accompanying drawings in which:

FIGURE 1 is a circuit diagram of the control system and

FIGURES 2 and 3 are graphs illustrating the controlling action of the system.

In the drawings, M is a direct current motor arranged to receive its armature voltage from an individual generator G having a field winding 1 supplied with magnetising current under the control of an amplifier having two output transistors T5 and T6.

The transistors T5 and T6 are controlled through the medium of two power amplifying transistors T3 and T4, by an electronic switch consisting of two transistors T1 and T2 arranged as a bi-stable multi-vibrator trigger circuit having an output circuit which controls the input of the first transistor T3 of the amplifier. The multivibrator is arranged to have two stable conditions in one of which the transistors T5 and T6 are switched to a maximum power output condition in which they develop the maximum output voltage across the winding 1, whereas in the other condition the output of the transistors T5 and T6 is cut off or reduced to a minimum. The effective excitation of the coil 1 is thus dependent upon the relative durations of the two stable conditions of the multivibrator and can be varied by varying such relative durations. As the winding 1 is necessarily highly inductive, a rectifier D is connected across it as shown to allow the magnetising current to flow round the rectifier circuit during the periods when the output of the transistors T5 and T6 is cut off. This enables a magnetising current having a value determined by the relative durations of the maximum and minimum output conditions of the transistors T5 and T6 to flow in the coil 1.

The box 30 in FIGURE 1 represents a source of (negative) voltage which determines the speed at which the motor M is to be controlled and which can be adjusted to set the speed to any desired value within the working range for which the system is designed. The two resistances 32 form part of a summing network by which the control voltage obtained from the box 30 is compared with an opposing voltage proportional to the back E.M.F. generated by the motor M fed back to the controller through the path 4. The resistances 32 are connected to the base of the transistor T1 at the junction point 31 in such a way that their combined current is proportional to the difference between the speed control voltage and the feedback voltage from the motor M. The combined current of the two resistances 32 thus represents the deviation of the system and is applied directly to the input of the trigger circuit at the point 31.

The oscillations necessary to effect the periodic switching of the trigger circuit are generated by the trigger circuit with the aid of a further feedback which proceeds from the winding 1 to the junction point 31 through a conductor 2, a resistance-capacitance integrating circuit 3 and a coupling circuit 5.

The integrating circuit 3 comprises resistances R3, R4, R6 and R7 and capacitances C1 and C2 and is designed so that its output approximates to the integral of the difference between the input voltage it receives from the winding 1 and the output voltage appearing across its condenser C2. This output voltage therefore has a D.C. component proportional to the effective mean value of the coil excitation resulting from the relative durations of the "mark" periods when the output of the transistors T5 and T6 is switched to its maximum value, and the "space" periods when the transistor output is switched to its minimum value. It also has an alternating component which gives it its saw tooth form. This is illustrated in FIGURE 2 of the drawings in which the rectangular wave 6 represents the input voltage $v1$ obtained from the winding 1 and the saw tooth wave 7 represents the output voltage $v2$ appearing across the condenser C2. It will be noted that the voltage $v2$ increases during the "mark" periods at a rate proportional to the difference between the maximum value of the voltage $v1$ and the standing value of the voltage $v2$ and falls during the "space" periods at a rate proportional to the standing value of the voltage $v2$. This enables the fluctuation of the voltage $v2$ when communicated to the point 31 to switch the trigger at intervals corresponding to the mark and space intervals of the rectangular wave 6 determined solely by the standing value of the voltage $v2$. The system is thus capable of maintaining the mean excitation of the field winding 1 at any level at which the deviation tends to zero. The "standing value" of the voltage v2 at any moment is the prevailing level of the D.C. component of that voltage, i.e. the mean value of voltage over a complete saw-tooth wave at any given moment.

The coupling circuit 5 comprises a capacitance C3 and resistance R5 and is designed to transmit the saw-tooth wave component of the voltage v2 with little or no distortion but at lower frequencies it responds to the rate of change of the D.C. level of the voltage v2 and thus introduces a control action which limits the rate of increase or decrease of the effective field excitation which results from a positive or negative deviation signal. The gain round the loop which includes the feedback from the winding 1 to the junction point 31 is made sufficiently high to ensure that the trigger circuit is switched at a sufficiently high frequency to obtain excitation of the field winding 1 at an effective level determined by the relative durations of the mark and space periods. The control loop including the feedback from the motor M to the junction point 31 has a very high gain such that the error voltage appearing at the junction point 31 tends to zero for any value of the current in the field winding 1.

In the operation of the system, when the deviation is sufficiently near zero, the system operates with a mean excitation determined by the standing value of the D.C. component of the voltage v2. When a deviation signal occurs (owing for example to an increase or decrease in the set speed signal from the box 30) the relative duration of the mark and space periods is automatically increased or diminished so as to produce an increase or decrease in the D.C. component of the voltage v2 in the sense to compensate for the deviation. Owing to the differentiating action of the coupling circuit 5, only a voltage proportional to the rate of change of this D.C. component is fed back to the point 31. Consequently, the relative duration of the mark and space periods continues to increase or decrease at a rate proportional to the deviation. In other words, only the rate of change of the effective excitation is limited by the value of the deviation and the correcting action will thus continue until the deviation disappears. This is illustrated in FIGURE 3 of the drawing in which the curve x shows the variation of the voltage v2 with time and the curve y shows the corresponding variations of the current through the resistance R5 of the coupling circuit. The vertical line z indicates the incidence of a step increase in the speed control voltage requiring a sudden increase in the speed of the motor M. Prior to the incidence of the step z, the voltage v2 rises and falls at rates corresponding to initial standing voltage across the condenser C2 which corresponds to the degree of excitation initially required. When the step-up occurs, the mean value of the current through the resistance R5 must at first increase, but the rate of increase of this mean value is limited by the fact that a negative feedback proportional to the rate of increase of the mean value of the voltage v2 is transmitted through the coupling circuit 5. The mean value of the voltage v2 therefore rises at a controlled final value such that an integral control action is achieved.

Whilst a system in which the coupling circuit 5 is designed to give an integral control action has been described, by way of example, the invention is not limited to this, as various shaping circuits could be substituted for the circuit 5 to obtain desired control actions. The only restriction that must be placed on the coupling circuit is that it must conduct the saw-tooth wave component of the voltage v2 sufficiently well to maintain the system in oscillation at a sufficiently high frequency to excite the field winding 1 at an effective level determined by the relative durations of the mark and space periods. This frequency should not be lower than say ten cycles per second and may be as high as 5000 cycles per second.

A condenser C4 is connected across the input terminals of the trigger circuit to prevent spurious oscillations.

I claim:

An automatic controller comprising an amplifier having an input and a power output, an electrical machine having a controlled condition variable in dependence upon said power output, a source of control voltage, means for generating an opposing voltage dependent upon said controlled condition, a bistable trigger circuit having an input and output coupled to the input of said amplifier, a summing network including two summing resistances connected to the input of said trigger circuit, means for applying said control and opposing voltages to said resistances respectively, and an oscillation-generating feedback path from said power output to the input of said trigger circuit, said feedback path including a resistance-capacitance integrating circuit arranged to produce an integrated voltage which varies in the direction for reducing the input to said amplifier during periods of high power output thereof at a rate dependent upon the difference between the maximum output voltage of the amplifier and the standing value of the integrated voltage and which varies in the direction for increasing the output of said amplifier during periods of low power output thereof at a rate dependent upon the standing value of the integrated voltage, and including also a coupling circuit interposed between said integrating circuit and the input circuit of said bistable trigger circuit and designed to transmit a correcting feedback dependent upon the standing value of said integrated voltage.

References Cited in the file of this patent
UNITED STATES PATENTS

| | | |
|---|---|---|
| 2,448,564 | Wilkerson | Sept. 7, 1948 |
| 2,461,871 | Bass | Feb. 15, 1949 |
| 2,726,331 | Robinson | Dec. 6, 1955 |
| 2,748,272 | Schrock | May 29, 1956 |
| 2,753,507 | Dodington | July 3, 1956 |
| 2,848,610 | Frienmuth | Aug. 19, 1958 |
| 2,864,985 | Beck | Dec. 16, 1958 |